US007882433B2

(12) United States Patent
Callaway et al.

(10) Patent No.: US 7,882,433 B2
(45) Date of Patent: Feb. 1, 2011

(54) SYSTEM AND APPARATUS FOR MANAGING PERSONAL AND WORK-RELATED MATTERS

(75) Inventors: Jeri L. Callaway, Spring, TX (US); William Caldwell Crosswy, The Woodlands, TX (US); Philip H. Doragh, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 922 days.

(21) Appl. No.: 10/038,202

(22) Filed: Dec. 21, 2001

(65) Prior Publication Data

US 2003/0129569 A1    Jul. 10, 2003

(51) Int. Cl.
*G06F 3/00* (2006.01)
(52) U.S. Cl. .................................................. 715/700
(58) Field of Classification Search ................. 345/963, 345/733; 705/9
See application file for complete search history.

(56) References Cited

U.S. PATENT DOCUMENTS

| 5,790,974 | A | | 8/1998 | Tognazzini | |
|---|---|---|---|---|---|
| 6,006,274 | A | * | 12/1999 | Hawkins et al. | 709/248 |
| 6,020,828 | A | * | 2/2000 | Gotou | 340/7.56 |
| 6,216,131 | B1 | * | 4/2001 | Liu et al. | 707/102 |
| 6,272,545 | B1 | | 8/2001 | Flanagin et al. | |
| 6,457,062 | B1 | * | 9/2002 | Pivowar et al. | 709/248 |
| 6,466,236 | B1 | * | 10/2002 | Pivowar et al. | 345/835 |
| 6,606,647 | B2 | | 8/2003 | Shah et al. | |
| 6,675,356 | B1 | * | 1/2004 | Adler et al. | 715/530 |
| 6,732,080 | B1 | | 5/2004 | Blants | |
| 6,779,022 | B1 | | 8/2004 | Horstmann et al. | |
| 6,785,868 | B1 | * | 8/2004 | Raff | 715/530 |
| 2001/0040591 | A1 | | 11/2001 | Abbott et al. | |
| 2002/0078379 | A1 | * | 6/2002 | Edwards et al. | 713/201 |
| 2002/0087386 | A1 | | 7/2002 | Phillips | |
| 2002/0194502 | A1 | | 12/2002 | Sheth et al. | |
| 2002/0196280 | A1 | * | 12/2002 | Bassett et al. | 345/751 |
| 2003/0045301 | A1 | | 3/2003 | Wollrab | |

OTHER PUBLICATIONS

Jeff Carlson, Palm Organizers, Copyright 2000, Peachpit Press, pp. 4, 56, 60, 66-73, 78-80, 82, 99, 104, and 152.*
Outlook, Calendar Screen Shots, 1999, Microsoft, pp. 1-5.*
Gunilla Bradley, "The information and communication society: how people will live and work in the new millennium," Ergonomics, vol. 43, No. 7, pp. 844-857, 2000.
United States Patent and Trademark Office, US Office Action dated Apr. 20, 2005, pp. 11.
United States Patent and Trademark Office, US Office Action dated Oct. 12, 2005, pp. 10.
United States Patent and Trademark Office, US Office Action dated Apr. 17, 2006, pp. 11.
United States Patent and Trademark Office, US Office Action dated Oct. 17, 2006, pp. 10.
United States Patent and Trademark Office, US Office Action dated May 16, 2007, pp. 11.

* cited by examiner

*Primary Examiner*—Ryan F Pitaro

(57) ABSTRACT

A family management system provides a family manager with family-related and work-related information. This information may be provided to the family manager in the form of one or more screens depicting calendars, e-mail, and/or other tasks. In particular, family-related and work-related matters may be merged on a single screen so that the family manager can facilitate scheduling better between family-related and work-related matters.

37 Claims, 18 Drawing Sheets

SYSTEM AND APPARATUS FOR MANAGING PERSONAL AND WORK-RELATED MATTERS

BACKGROUND OF THE INVENTION

1. Field of the Invention

The present invention generally relates to a management system and, more particularly, to a management system for managing personal and work-related matters.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Traditionally in most human societies down through the ages, men have performed the "bread-winning" function for their family, and women have performed the "homemaking" function for their family. These basic functions have, of course, evolved through time as societies have grown and matured and as technology has advanced. For instance, in more ancient hunting and gathering societies, men typically killed and/or gathered the food, while the women typically prepared the food for the family. In more modern societies, however, bartering and, eventually, monitary systems evolved. Yet even in these more modern systems, the roles of men and women changed little. Men performed the functions directly related to earning the money, while women performed the functions of raising the children and managing the household.

In more recent history, this functional division between men and women remained relatively intact until the dawn of the industrial revolution. During the early years of the industrial revolution, not only did men take jobs to earn money, but some women and children began to work for money as well. Nevertheless, even the industrial revolution did not alter the traditional functions of men and women dramatically, because most women did not enter the workforce. However, in the first half of the twentieth century, two major events, World War I and World War II, triggered the entry of many more women into the workforce, because so many men had left the workforce to participate in the wars. It was during this time that society in general, and women in particular, realized the value and ability of women to perform these more traditional male "bread-winning" functions.

Although the 1950s saw a decrease of women in the workforce, the inflationary pressures of the 1960s and the movement of American society from a rural, agricultural society to an urban industrial society again began drawing more women into the workforce. This trend continued throughout the remainder of the twentieth century. Indeed, by the year 2000, more women than ever before were participating in the workforce.

Despite the fact that more women than ever are now performing the traditional male "bread-winning" function, few men have left the workforce to perform the more traditional "homemaking" function of women. In other words, the number of nuclear families with children where both spouses work has increased dramatically over the last 50 years, and it is currently at or near its highest level ever. Again, it does not appear that this trend will change any time soon.

Of course, the "homemaking" function must still be performed. The family's residence must still be cleaned, meals must be prepared, children must be bathed and clothed, doctor appointments must be made, and children must be picked up from extracurricular activities after school. However, despite the fact that men and women now share the "bread-winning" function, the brunt of the "homemaking" function still appears to fall generally upon the shoulders of working women. As a result, working women find themselves torn between "bread-winning" responsibilities and "homemaking" responsibilities. Generally speaking, working women want to excel at both, becoming what has often been referred to as "super moms." Unfortunately, performing both functions well is a Herculean task in view of time pressures and the often conflicting commitments of work matters and family matters. Accordingly, it would be desirable to provide families, and particularly the women that manage their families, with a tool that permits them to manage their personal lives and their work lives in a more efficient manner.

The present invention may address one or more of the concerns set forth above.

BRIEF DESCRIPTION OF THE DRAWINGS

The foregoing and other advantages of the invention will become apparent upon reading the following detailed description and upon reference to the drawings in which:

FIG. 18A illustrates a screen showing work contacts;

FIG. 18B illustrates a screen showing personal contacts;

FIG. 18C illustrates a screen showing merged contacts;

FIG. 19A illustrates a screen for making new work contacts;

FIG. 19B illustrates a screen for making new personal contacts;

FIG. 19C illustrates a screen for making new work or personal contacts;

DETAILED DESCRIPTION OF SPECIFIC EMBODIMENTS

Figure 2:
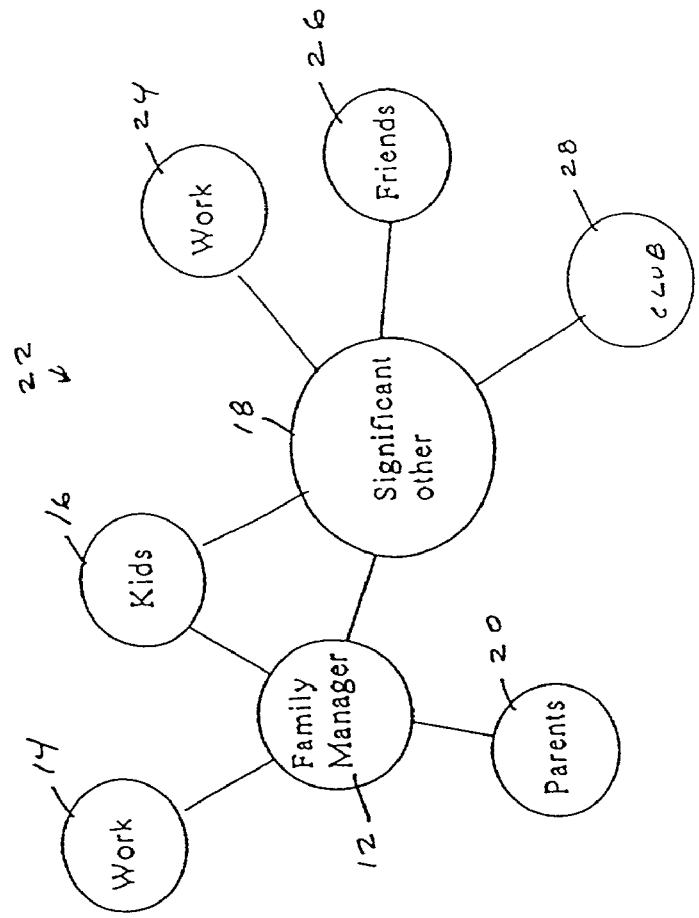
FIG. 2 illustrates a diagram of a plurality of hubs for personal and work-related matters.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

"Working from home" is now part of our everyday lexicon. In other words, many people now perform traditional work functions from their homes. Many factors have contributed to this shift. For example, the continued increase of urban congestion has snarled traffic in many urban areas, thus making commuting between home and work an often unpleasurable experience. Commutes are also getting longer because many jobs are often concentrated in relatively small areas, such as downtown areas, while the majority of workers often live in suburban areas typically well over ten miles away. Of course, advancements in technology, as well as the shift toward a more information-based society, have contributed to this phenomenon as well. Indeed, with the advent of powerful personal computers, electronic messaging, and high-speed data links, many workers are able to perform their job functions admirably from home.

"Homing from work" is also becoming more common. As the phrase suggests, people are often finding themselves performing more home-related functions while at work or during the work day. This phenomenon is primarily due to the fact that more households are becoming dual income households where both spouses work. Thus, because neither spouse is home during the day to perform home-related functions, some of these functions are often performed during the work day.

From the discussion above it is clear that the work environment and the home environment are converging. In other words, business and personal lives are rarely segregated entirely. However, even with this convergence, most families continue to have a "hub"—one person who is predominantly balancing family logistics and scheduling with work. This person may be referred to as the "keeper of the calendar" or the "family manager." In most families, the family manager is the wife and mother, and these women are primarily "homing from work" in an effort to perform their work functions and family functions. Accordingly, it would be beneficial to provide the family manager with a tool to facilitate the scheduling and management of family matters as well as work matters.

The family manager not only coordinates their work along with the planned events of various family members, but also often handles various other situations that may arise. For instance, the family manager is often the first person contacted in times of urgency or emergency. The family manager also typically coordinates the inevitable changes of plans, updates family members, shares schedules and plans with other family members, and provides reminders of upcoming events. At present, the family manager primarily communicates with other family members by telephone and primarily keeps track of the plans with paper or electronic lists. Unfortunately, such methods are often not efficient. In regard to telephone communications, the conversations are often too long in that the conversations are rarely restricted to the particular scheduling matter at hand. It is not always convenient to talk, as one party may be unable to talk when the other party calls. Furthermore, it is not always desirable to talk, as the parties may be antagonistic toward one another yet be forced to communicate nonetheless. In regard to the lists, it is often difficult to update and synchronize such lists.

It would be desirable to provide the family manager with a dual access tool that provides a separation as well as a quick and smooth transition between work-related information and personal-related information, such as e-mails, calendars, contacts, lists, reminders, etc., and that also provides boundaries between these two types of information to ensure that potentially confidential business information is not shared with family members and to ensure that personal information is not shared with business associates. Indeed, maintaining a work/life balance often involves setting priorities and boundaries and having the tools and discipline to maintain them. Furthermore, beyond the issues of security and confidentiality, psychological boundaries are often advantageous. For example, when one is focusing on family-related issues, one would normally appreciate the ability to avoid business matters, and vice versa.

It would also be advantageous if such a tool provides periodic or real-time updates, travels easily, and generates an identifiable notification (such as a sound, vibration, and/or display change) to the user when updates or reminders occur. In accordance with one aspect, such notification may include emergency notifications that are distinct from normal notifications, and the distinctions may carry further such that work related notifications (both normal and emergency) are distinct from personal notifications (both normal and emergency).

It would further be advantageous if such a tool provides non-verbal communication, such as text messaging, and/or non real-time verbal communication, such as voice mail. Textual communication is often more convenient and/or desirable than real-time verbal communication, i.e., an actual conversation. For example, real-time verbal communication requires that the schedules of the caller and the called to correspond long enough to hold a conversation, whereas textual communication does not. Also, in some instances communication is necessary but often not desirable, such as communications between divorced parents. In these instances, a textual exchange or voice mail messages are often preferable and less adversarial than real-time verbal communication. Such communication devices may include pagers, handheld personal computers, laptop personal computers, PDAs, cellular phones, etc., utilizing appropriate hardware, firmware, and/or software.

Figure 1:
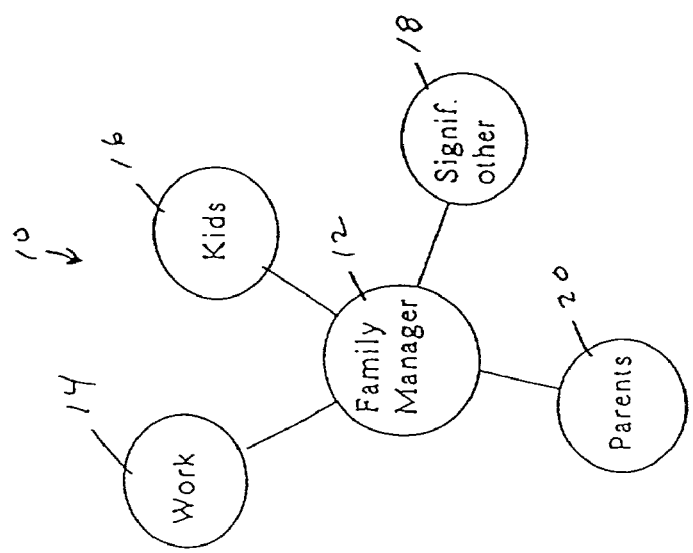
FIG. 1 illustrates a diagram of a single hub, e.g., one who is predominately balancing family logistics and scheduling with work.

Turning now to the drawings, and referring initially to FIG. 1, an exemplary management network is illustrated and generally referred to using the reference numeral 10. At the center of this management network 10 is the family manager or hub 12. Various entities, which are illustrated in FIG. 1 as extending from the hub 12 like spokes, may be in communication with the family manager. These entities may include work 14, kids 16, a significant other 18, and parents 20, for example. As discussed previously, the family manager typically is responsible for various work-related matters, as well as various family-related matters. To schedule, coordinate, and perform these various matters, the family manager as the hub 12 typically communicates with various entities, such as those illustrated in FIG. 1. To facilitate such communication, as well as the scheduling of these various matters, it is not only advantageous that the family manager possesses a tool capable of maintaining e-mails, calendars, contacts, and/or lists, but it is also advantageous if each of the entities 14, 16, 18, and 20 also possess a suitable tool that can communicate with the family manager's tool either directly or indirectly.

Of course, the management network may include a plurality of hubs. By way of another example, FIG. 2 illustrates an alternate network 22 where the family manager 12 is illustrated as a hub that communicates with various entities, such as work 14, kids 16, a significant other 18, and parents 20. However, in the network 22, the significant other 18 is also a hub. This second hub communicates with various entities or spokes, such as work 24, friends 26, and a club 28, as well as the kids 16. In this scenario, each spouse in the family can coordinate their own work schedules with the various family matters, as well as various recreational matters, for which they are responsible. Again, to facilitate this management, it is advantageous if each of the hubs and each of the entities in the network 22 possess a suitable tool as described previously. Furthermore, it should be appreciated that while FIG. 2 illustrates only two hubs, the number of hubs that may be present in an extended management network does not appear to be limited.

Figure 3:
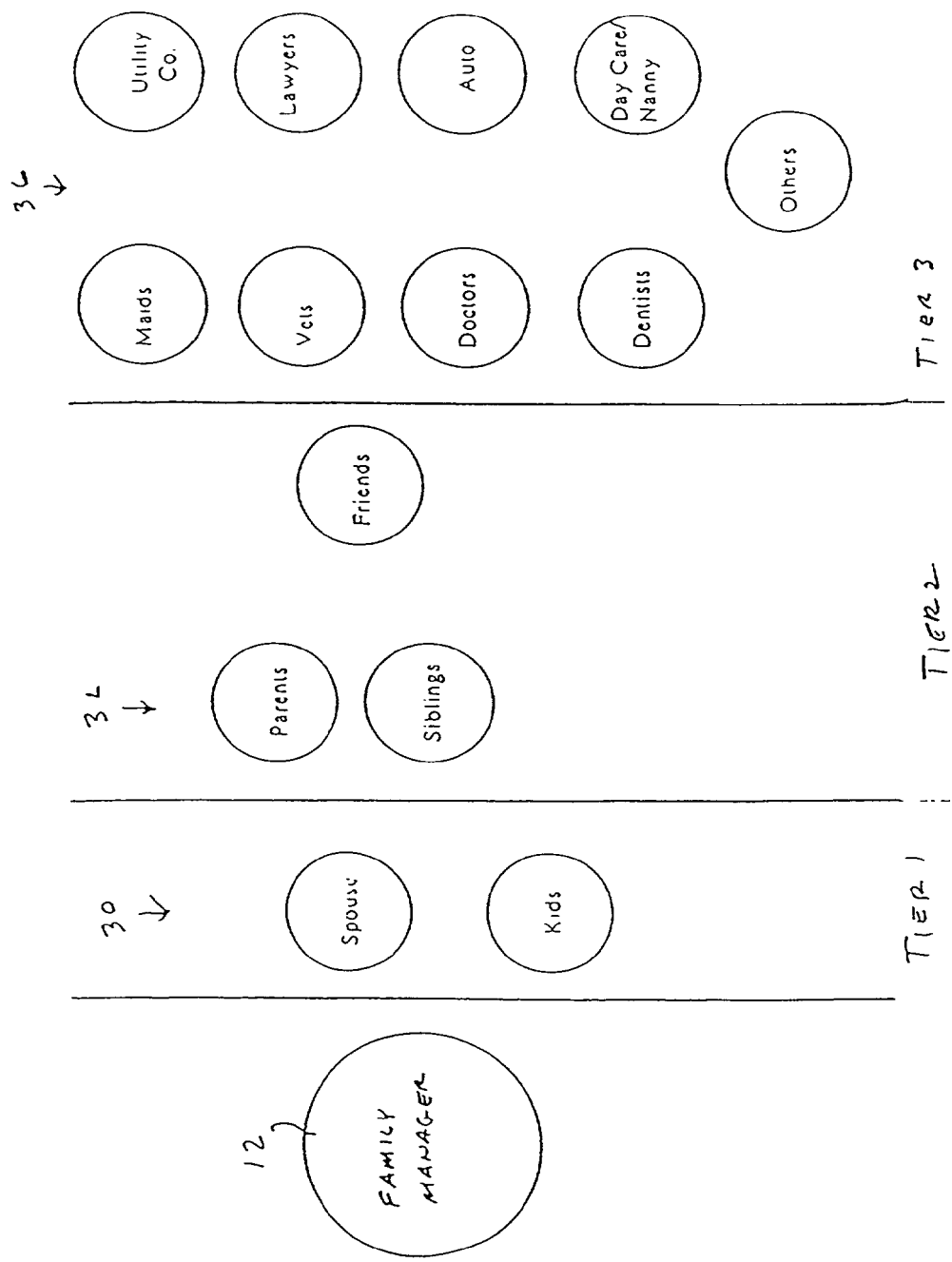
FIG. 3 illustrates a diagram of a single hub and three tiers of spokes for personal matters.

In the sense that the number of hubs in an extended network may be numerous, it should also be appreciated that the number of spokes or entities communicating with any single hub may be numerous and, again, apparently limitless. Of course, it should be appreciated that, in a typical situation, certain spokes or entities will communicate more frequently with the hub or manager 12 than others. Using the frequency of communication as a rough guideline, entities may be classified into categories or tiers as illustrated in FIG. 3. The entities 30, such as the spouse and the children, in tier 1 will typically communicate with the hub or manager 12 most frequently, and these communications are typically the most critical. The entities 32, such as parents, siblings, or friends, in tier 2 will typically communicate with the hub or manager 12 somewhat less frequently, and these communications are typically less critical. The entities 36 in tier 3 will typically communicate with the family manager or hub 12 less frequently than the entities 30 and 32 in tiers 1 and 2. Thus, it can be seen that the family will derive the most benefit from the management technique described herein by virtue of communication with the entities 30 in tier 1, and that the benefit gradually lessens as the communication frequency and/or criticality lessens through tiers 2 and 3.

Figure 4:
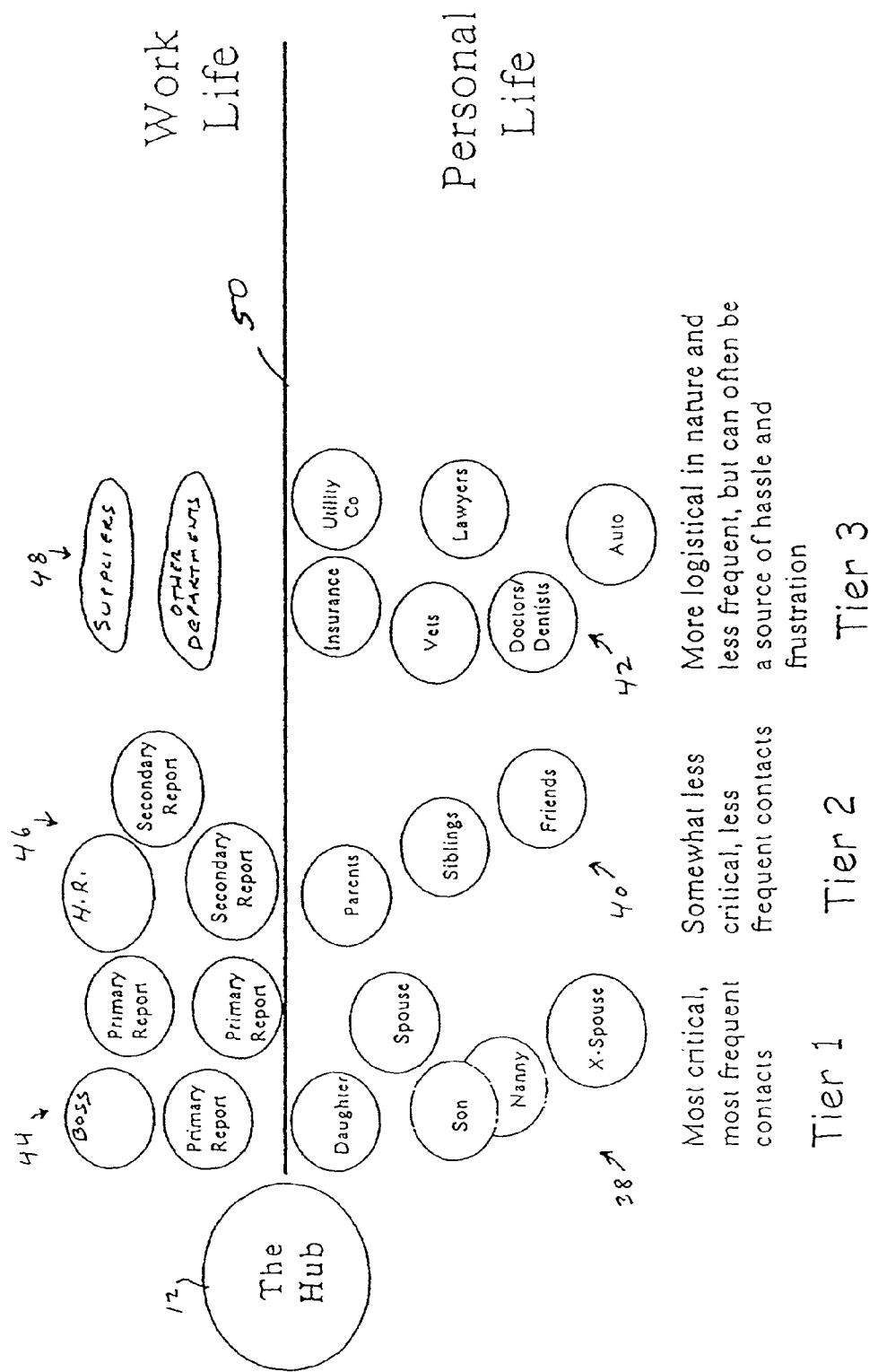
FIG. 4 illustrates a diagram of a single hub and three tiers of spokes for personal and work-related matters.

It should be understood that FIG. 3 illustrates only tiers of entities related to the family manager's personal life. As discussed previously, however, the family manager 12 also typically has a work life as well. Like the various entities that the family manager deals with in her personal life, the various entities related to the family manager's work life also can be classified by the frequency and/or criticality with which the family manager communicates with these entities. As illustrated in FIG. 4, on the personal side, the family manager as the hub 12 may frequently communicate with various entities 38 in tier 1, and communicate less frequently with the various entities 40 and 42 in tiers 2 and 3, respectively. Similarly, the hub 12 may also communicate with various work-related entities. These work-related entities may also be categorized into various tiers, such as tiers 1, 2, and 3, based on the frequency and/or criticality of communication with the hub and/or organizational relationship with the hub 12, for instance. In this example, the hub communicates most frequently with the entities 44, such as the boss and primary reports, in tier 1. The entities 46, such as personnel department and secondary reports, in tier 2 represent somewhat less critical and/or less frequent contacts. Finally, the entities 48, such as suppliers and employees in other divisions or departments, in tier 3 may be more logistical in nature and communicate with the hub 12 less frequently.

It should also be understood that a barrier 50 is advantageously placed between personal entities 38, 40, and 42 and work-related entities 44, 46, and 48. In other words, although the family manager 12 may communicate with various work-related entities and various personal entities, and thus have access to both work-related and personal information, specific work-related information should not be available to personal entities, and specific personal information should not be available to work-related entities. Thus, the barrier 50 prevents personal entities from accessing specific work-related information and prevents work-related entities from accessing specific personal information. Of course, information of a general nature, such as blocks of time dedicated or previously scheduled for a personal or work-related purpose, may be shared.

Figure 5:
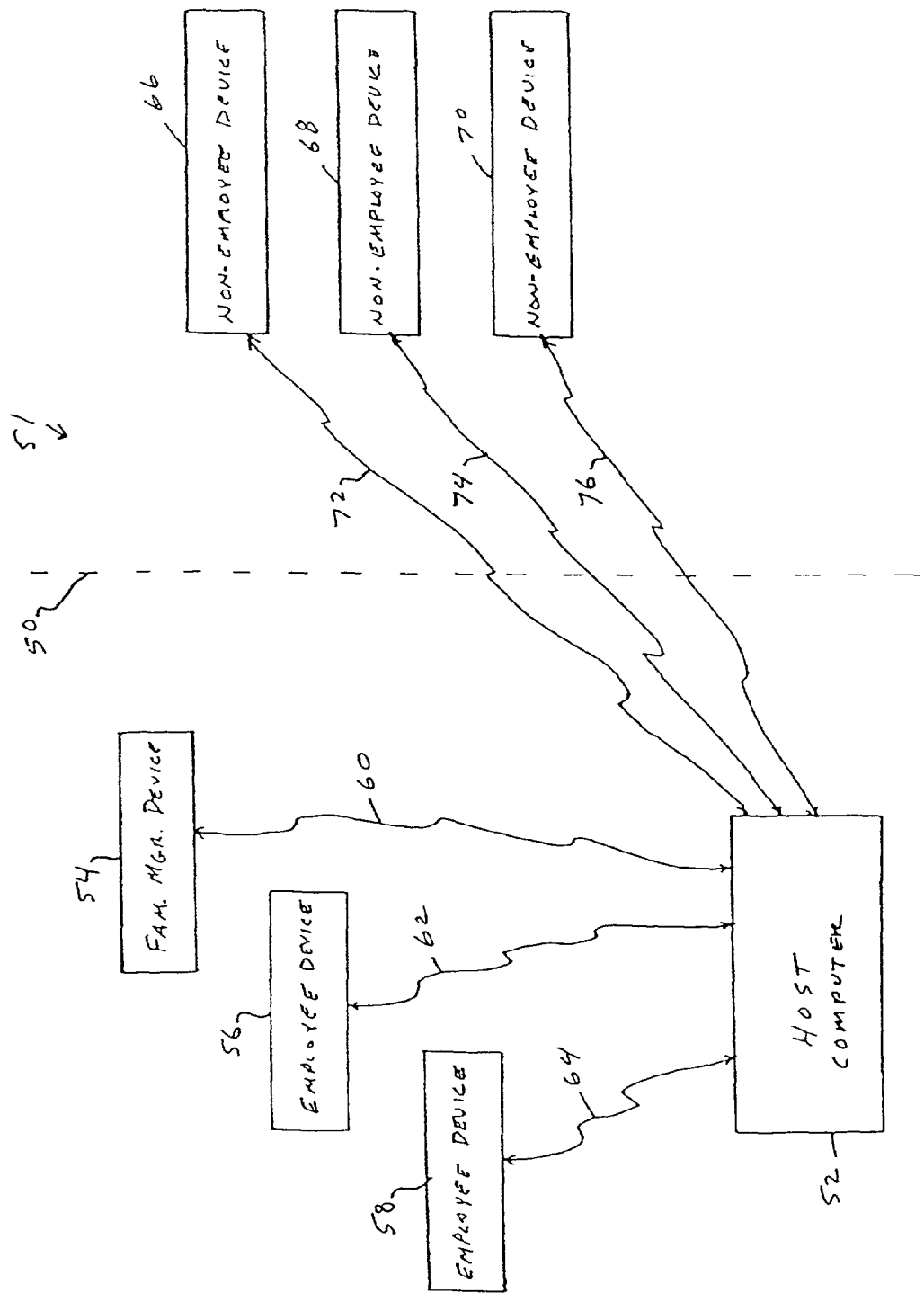
FIG. 5 illustrates an embodiment of the present invention utilizing only a private host computer.
Figure 6:
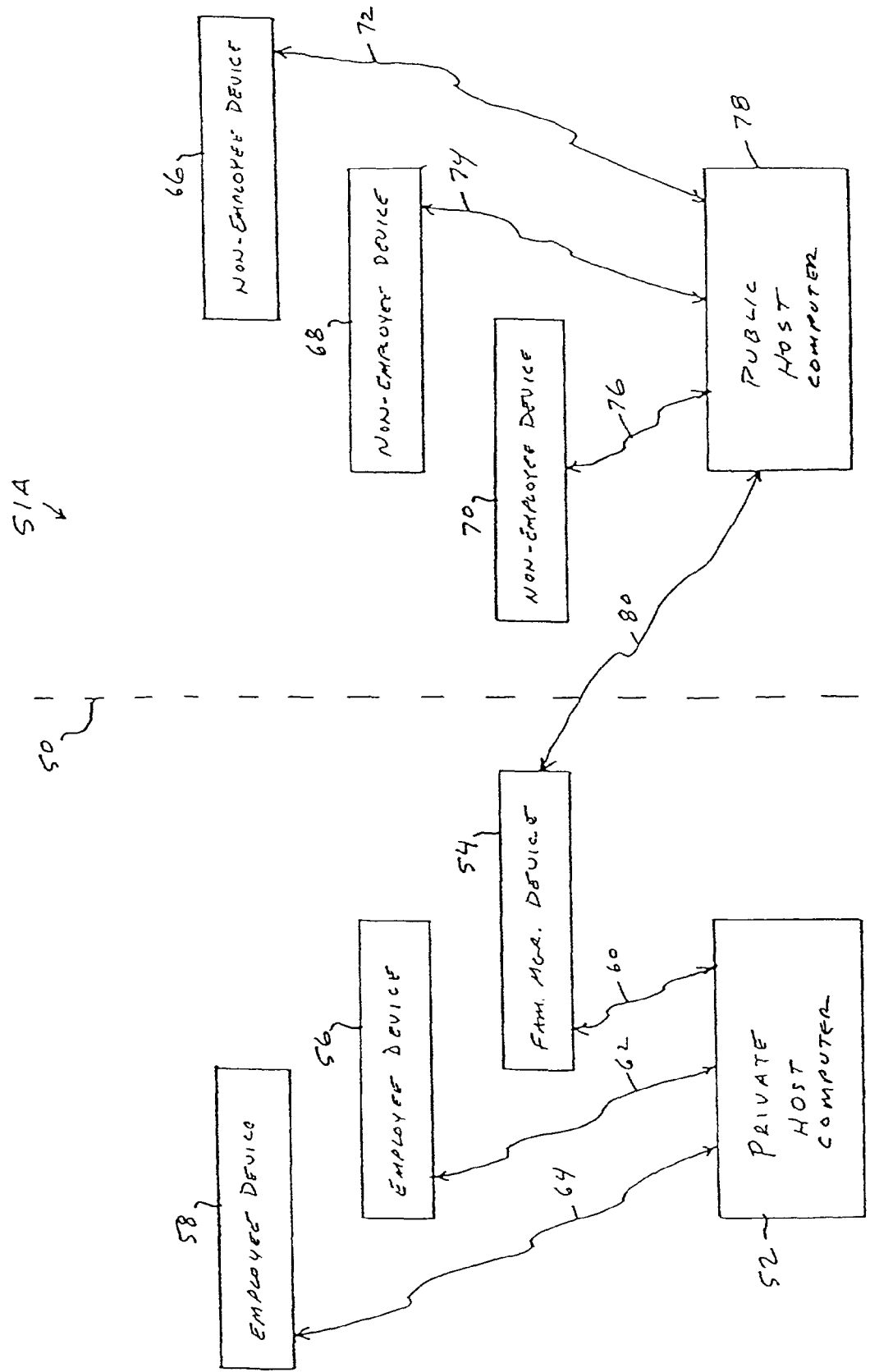
FIG. 6 illustrates an embodiment of the present invention utilizing a private host computer and a public host computer.

FIGS. 5 and 6 illustrate two exemplary systems that may be used to accomplish the management tasks discussed herein. Referring first to FIG. 5, a private host system 51 is illustrated. In the private host system 51, a private host computer 52 facilitates communications between the hub or manager 12 and various entities. The private host computer 52 may be, for example, a server primarily dedicated to the company at which the manager works. The family manager 12, as well as each entity with which the family manager 12 communicates, has a communications device for communicating with the private host computer 52. As previously discussed, such a communications device may take various forms. On the work-related side, the private host computer 52 communicates with the communications device 54 of the manager 12, as well as the communications devices 56 and 58 of other employees via appropriate communications links 60, 62, and 64, respectively. The communications links 60, 62, and 64 may be of any suitable type, such as wireless, hard-wired, the Internet, an intranet, etc. Similarly, on the personal side, the communications devices 66, 68, and 70 of non-employees communicate with the private host computer 52 via links 72, 74, and 76, respectively. The communications links 72, 74, and 76 may also be of any suitable type.

The communications devices 56, 58, 66, 68, and 70 of the various entities that may wish to communicate with the family manager at the hub 12 are typically capable of communicating e-mail, text messaging, calendar, and/or list information to the private host computer 52. In terms of calendaring for instance, the private host computer 52 runs appropriate software, such as Exchange calendaring software available from Microsoft Corporation or Lotus Notes software available from I.B.M., to maintain both a work-related calendar and a personal calendar. Accordingly, information from the other employees received from the devices 56 and 58 is added to the work-related calendar, while information from the non-employees received from devices 66, 68, and 70 is placed in the personal calendar. Thus, as discussed in greater detail below, the private host computer 52 can communicate this information to the communications device 54 of the manager 12, so that the manager 12 can view the work calendar, the personal calendar, or a merged calendar that displays both work and personal information.

Because companies typically do not store company-related information on public host computers, the system 51 will typically include a private host computer 52 so that the devices 54, 56, and 58 of the employees can access company-related information. Of course, in the system 51 illustrated in FIG. 5, the company must give non-employees access to the private host 52 so that the devices 66, 68, and 70 can store and retrieve personal information. However, many companies may be unwilling to provide non-employees access to a host computer that contains sensitive company-related information. Accordingly, a "public" host computer 78 may be included in an alternate system 51A as illustrated in FIG. 6. In this context, the term "public," may refer to a true public host computer, such as a host computer operated by America On Line or other internet service providers, or it may refer to a quasi public host computer, such as a host computer operated by the company that is primarily dedicated to serving non-employees and that does not contain sensitive company-related information.

In the system 51A, the devices 54, 56, and 58 of the family manager and the other employees access the private host 52 using respective links 60, 62, and 64, as described previously with respect to the system 51. However, in this embodiment, the private host computer 52 does not communicate directly with the devices 66, 68, and 70 of the non-employees. Instead, the devices 66, 68, and 70 communicate with the public host 78 using respective links 72, 74, and 76. To obtain the personal information stored on the public host 78 by the non-employees, the device 54 of the family manager establishes a link 80 with the public host 78. Once the device 54 of the family manager has received the company-related information from the private host 52 and the personal information from the public host 78, the device 54 can present the information to the family manager in the same manner discussed above with respect to the system 51.

In the systems 51 and 51A described above, the boundary 50 is implemented by the host computer(s) so that the family manager's device 54 can access both personal and work-related information, while ensuring that specific personal information is not accessible by devices dedicated to work-related entities and that specific work information is not accessible by devices dedicated to personal entities. It should be appreciated that the boundary 50 can be implemented in a number of ways, such as by providing different computers for personal and work-related information or by providing each access device or entity with certain access levels, security codes, passwords, etc., and that providing suitable boundaries in a specific implementation would be a routine undertaking of design, fabrication, and manufacture for those of ordinary skill having the benefit of this disclosure.

Of course, depending upon the ability of the devices used by the family manager and the various entities, they may be able to communicate directly between one another without using any type of host computer. For example, an ad-hoc wireless network, using Bluetooth or 80211b for instance, may allow the PIM applications to trade entries with one another without using a host computer.

Figure 7:
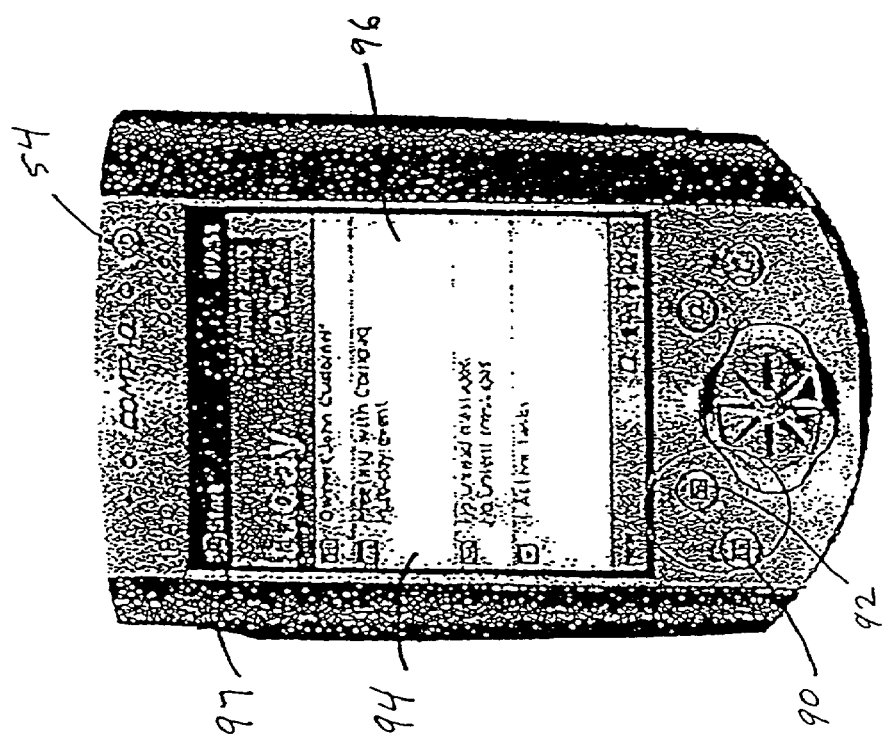
FIG. 7 illustrates an apparatus, such as a handheld computer, such as a Compaq ipAQ computer, for use in practicing the present invention.

As previously mentioned, the devices 54, 56, 58, 60, 68, and 70 may be selected from a variety of different devices, such as a handheld PC, laptop PC, desktop PC, home appliance, cellular phone, cellular pager/viewer, Compaq iPAQ, Palm Pilot, Blackberry, etc. In this particular embodiment, the device 54 is illustrated in FIG. 7 as an iPAQ pocket PC available from Compaq Computer Corporation. Devices of this type typically include a variety of input methods, such as touch sensitive display, software keyboard, handwriting recognition, panel buttons, customizable application buttons, and a pointing stick. Accordingly, the manner in which a user, such as the family manager, inputs data into the device 54 may vary depending upon the available type of input method selected by the user. For example, the device 54 may be configured so that pressing the button 90 selects the calendar and pressing the button 92 selects a list of contacts for viewing on the display 94. Continuing to press the button 90 may toggle between various stored calendars, such as the merged calendar, the work calendar, and the personal calendar to be discussed below. Devices of this type also typically include various communications options, such as a USB communications port and infrared ports. Of course, the particular type of device selected, the manner of entering data into the device, the manner in which the device communicates with the host computer(s), and the manner in which the device displays information to the user are widely variable. Nevertheless, the various features of the present embodiment will be described in greater detail with reference to the remaining figures that illustrate a variety of screens that the device 54 may display to the user.

Figure 8:
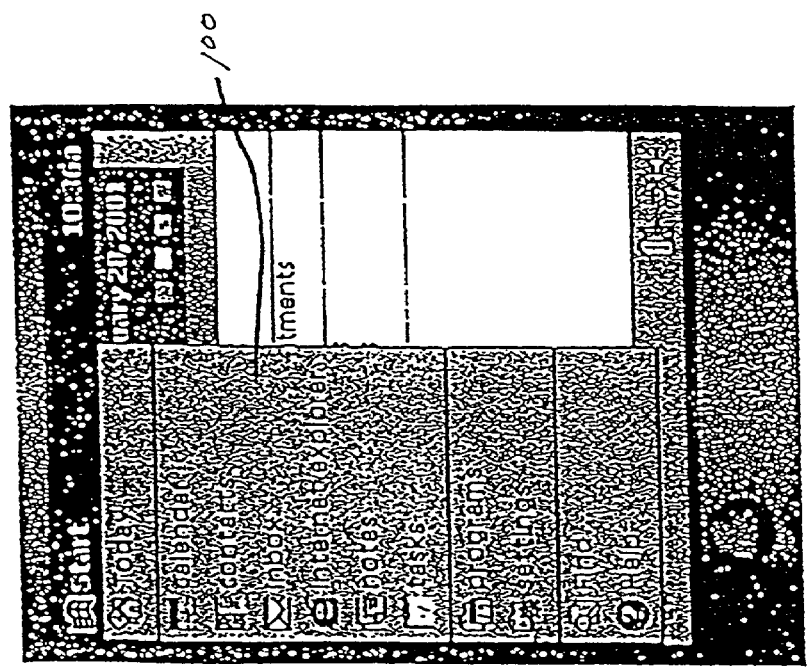
FIG. 8 illustrates a start menu.
Figure 9:
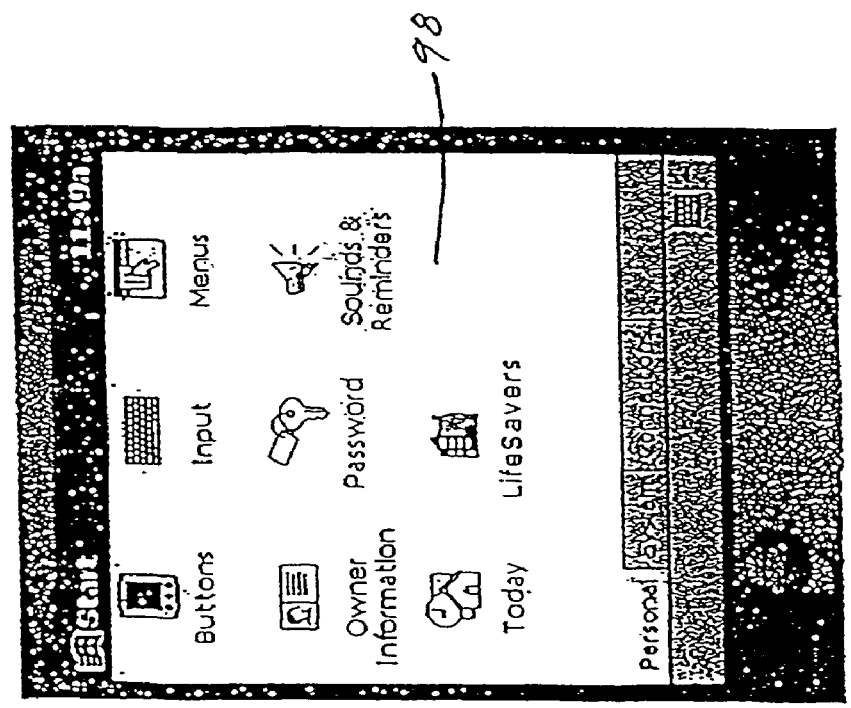
FIG. 9 illustrates a settings screen.

To begin using the system, a start screen 96 may display a start menu icon 97. By choosing an icon on the screen 96 or by selecting a command on the start menu 100 illustrated in FIG. 8, an application may be launched. As illustrated in FIG. 8, the start menu 100 may provide various choices to the user so that the user may access "today's" agenda, along with various calendars, contacts, user's inbox, an internet explorer, notes, and tasks. In addition, the settings for the device 54 may be displayed and changed by selecting "settings" to cause the device 54 to display the various settings options illustrated on the screen 98 in FIG. 9.

Figures 10A, 10B, 10C:
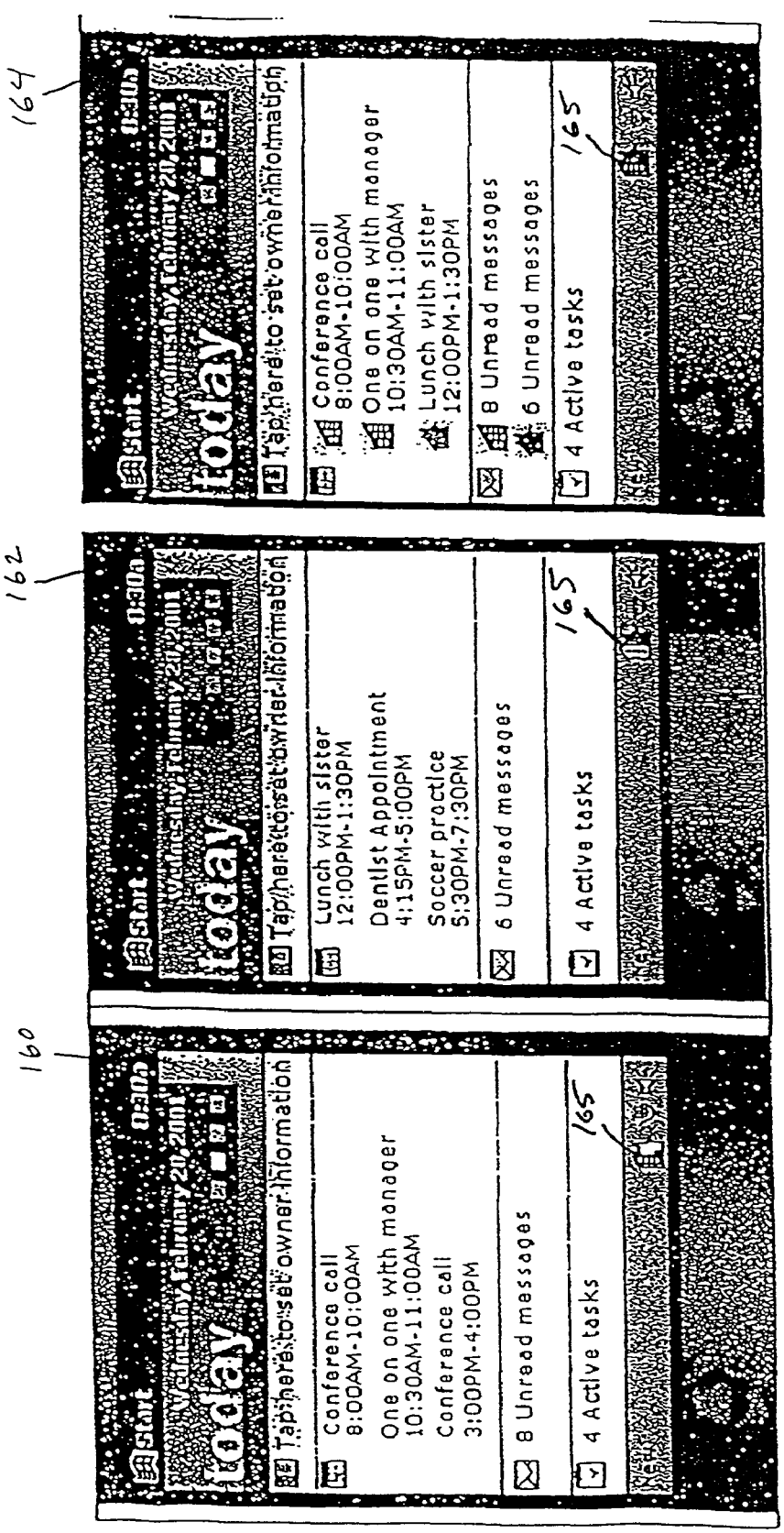
FIG. 10A illustrates a screen showing a daily view of appointments, unread messages, and active tasks related to work.
FIG. 10B illustrates a screen showing a daily view of appointments, unread messages, and active tasks related to personal.
FIG. 10C illustrates a screen showing a daily view of appointments, unread messages, and active tasks in a merged environment.

Using "today's" agenda, the device 54 advantageously provides the family manager with schedules, e-mail access, and other tasks, such as notes and "to do" lists. Accordingly, it may be advantageous for the device 54 to display screens that inform the user of unread e-mail messages and active tasks, as well as the agenda items. Such screens are illustrated in FIGS. 10A, 10B, and 10C as "today" screens 160, 162, and 164. The today work screen 160 informs the family manager of the work-related agenda, as well as work-related e-mail messages and tasks, and the today personal screen 162 informs the family manager of the personal agenda, as well as personal e-mail messages and tasks. The today work screen 160 and the today personal screen 162 may be merged into a today merged screen 164 that provides the user with a merged view of work related and personal agenda items and unread e-mail messages.

A user may switch between the today work screen 160, the today personal screen 162, and the today merged screen 164 using a 3-state toggle icon 165. In this embodiment, the toggle icon 165 is depicted as having a left portion resembling an office building and a right portion resembling a house. As illustrated in FIG. 10A, when the today work screen 160 is showing, the left portion of the toggle icon 165 is blackened while the right portion is white to inform the user that the today work screen 160 is active. By toggling the toggle icon 165 once, the today personal screen 162 is displayed, and the left portion of the toggle icon 165 is white while the right portion is blackened to inform the user that the today personal screen 162 is active, as illustrated in FIG. 10B. By toggling the toggle icon 165 once again, the today merged screen 164 is displayed, and both the left and right portions of the toggle icon 165 are blackened to inform the user that the today merged screen 164 is active, as illustrated in FIG. 10C. The toggle icon 165 may also be used to toggle between other work, personal, and merged screens described below.

Figure 11:
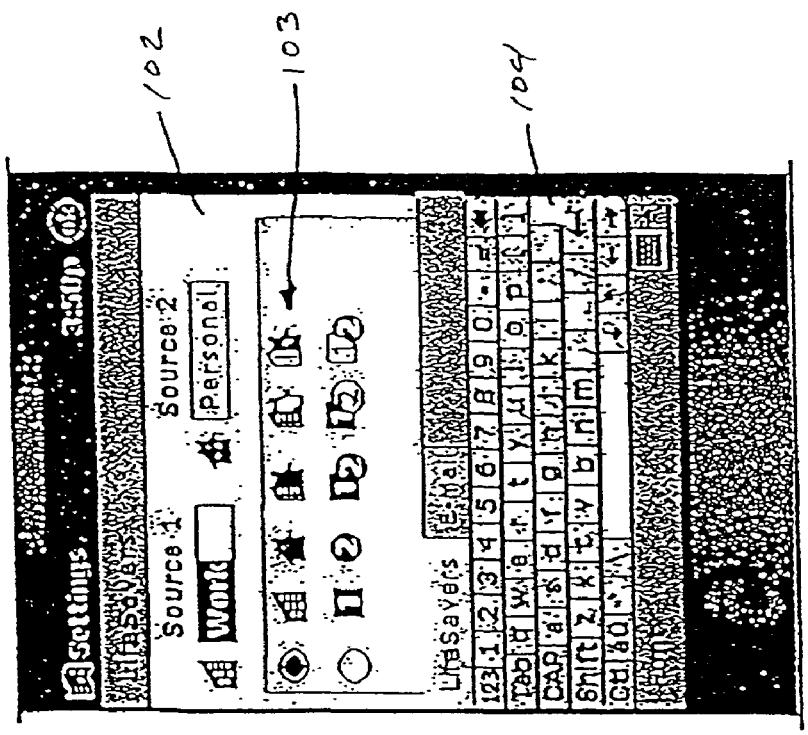
FIG. 11 illustrates a screen for defining database sources.
Figure 12:
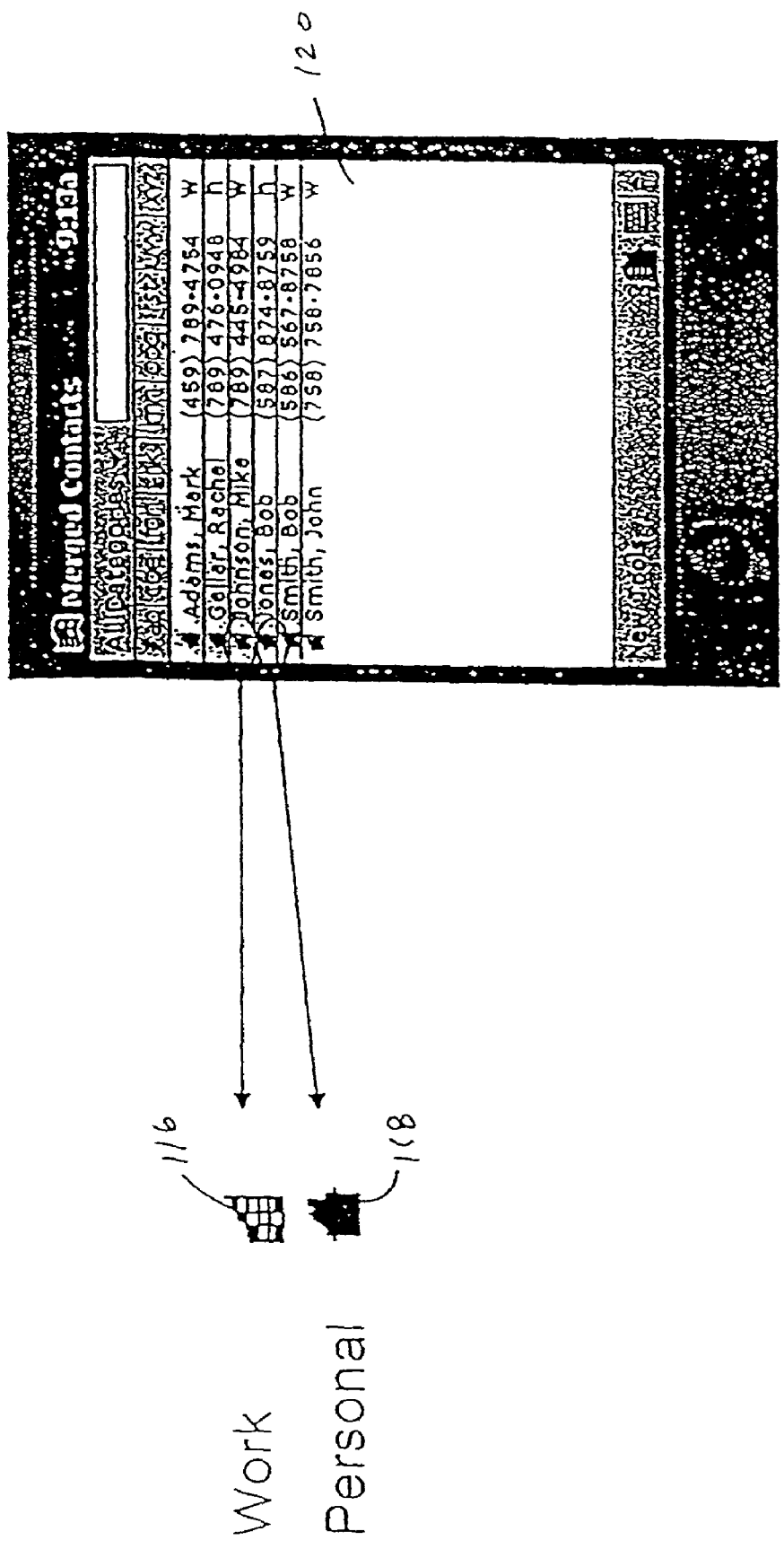
FIG. 12 illustrates a screen showing merged work and personal contacts identified by respective icons.

The work-related information and the personal information may be uniquely identified using appropriate icons, colors, fonts, etc. Because one of the features of the system is its ability to distinguish between work-related information and personal information, a source screen 102 may be provided as illustrated in FIG. 11. By using this screen, the user may define information as being "work-related" information or "personal" information by selecting either source 1 or source 2. The information may be typed into the device 54 using the virtual keyboard 104 or by using the handwriting recognition software. As illustrated in FIG. 11, and as discussed in additional detail below, various icons 103 may be used to identify and/or select the source of the information as being personal, work-related, or some type of merger of the two. For example, as illustrated in FIG. 12, a merged contacts screen 120 displays the names of the contacts, along with other information, such as telephone numbers. Because the merged screen 120 displays both personal and work-related contacts, the merged contact screen 120 also advantageously displays a work icon 116 or a personal icon 118 beside each contact so that the family manager can determine at a glance whether the contact is work-related or personal. Instead of or in addition to identifying contacts using the work icon 116 or the personal icon 118, the agenda items on the merged calendar screen 114 and/or the contacts on the merged contact screen 120 may be identified as work or personal contacts or items using color and/or font.

Figures 13A, 13B, 13C:
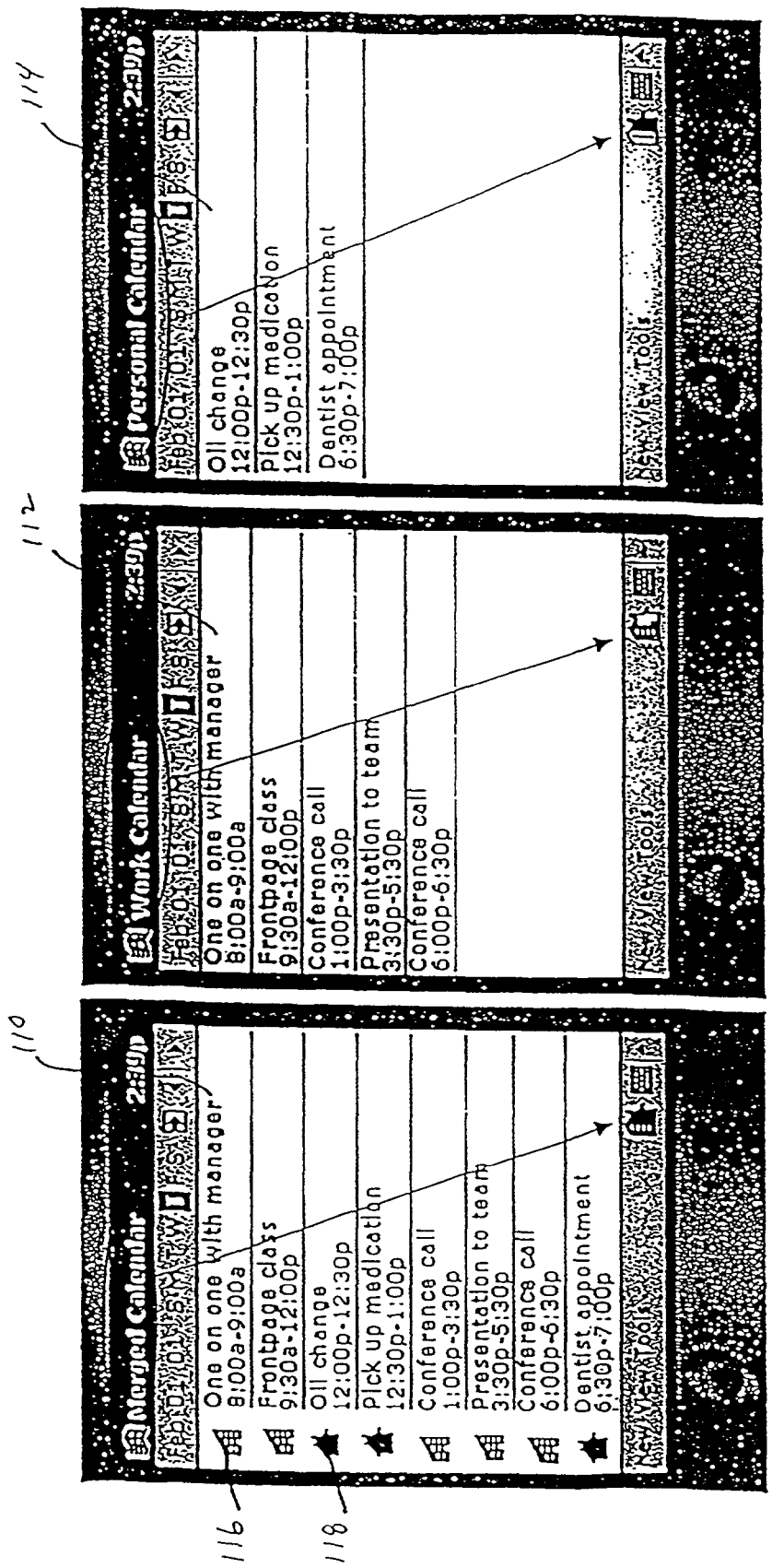
FIG. 13A illustrates a screen showing a daily work calendar.
FIG. 13B illustrates a screen showing a daily personal calendar.
FIG. 13C illustrates a screen showing a daily merged calendar.

The device 54 may display a daily work calendar 110, as illustrated in FIG. 13A, as well as a daily personal calendar 112, as illustrated in FIG. 13B. As can be seen from these illustrations, each item in the work calendar 110 is clearly work-related, and each item on the personal calendar 112 is clearly related to a personal matter. To provide the family manager with an additional benefit, the device 54 may display a merged calendar 114, as illustrated in FIG. 13C. The toggle icon may be used to select among these three calendars. As can be seen, the daily merged calendar not only displays the current time, date, and day for the family manager, but it also displays each work-related matter and each personal matter in chronological order from the work calendar 110 and the personal calendar 112. In addition, it further displays an icon next to each item so that the family manager can determine whether the agenda item is a work-related matter or a personal matter at a glance. As discussed above, the icons 116 that resemble buildings designate work-related agenda items, while the icons 118 that resemble houses represent personal agenda items.

The user's calendars may be supplemented by information added by the family manager or by information added by work contacts and family contacts. Conflicts on the work calendar and on the personal calendar are handled as in typical calendaring systems. For example, if a conflict exists, the calendaring system may not allow anyone other than the user or other authorized party, such as a secretary or co-family manager, to alter the calendar to cure the conflict. Similarly, when the work calendar and the personal calendar are combined to form the merged calendar, conflicts may exist, and these conflicts may also be resolved by an authorized party. In an effort to avoid conflicts, certain information regarding a user's schedule may be transmitted to other users. Whether this information is complete or merely illustrates that a block of time has already been taken may depend upon the relationship between the users, but it may nonetheless be sufficient to demonstrate a possible conflict. Even if no information of this type is transmitted shared by users, the device 54 may deliver a message to the family manager or other users to provide an alert that a conflict exists.

Figures 14A, 14B, 14C:
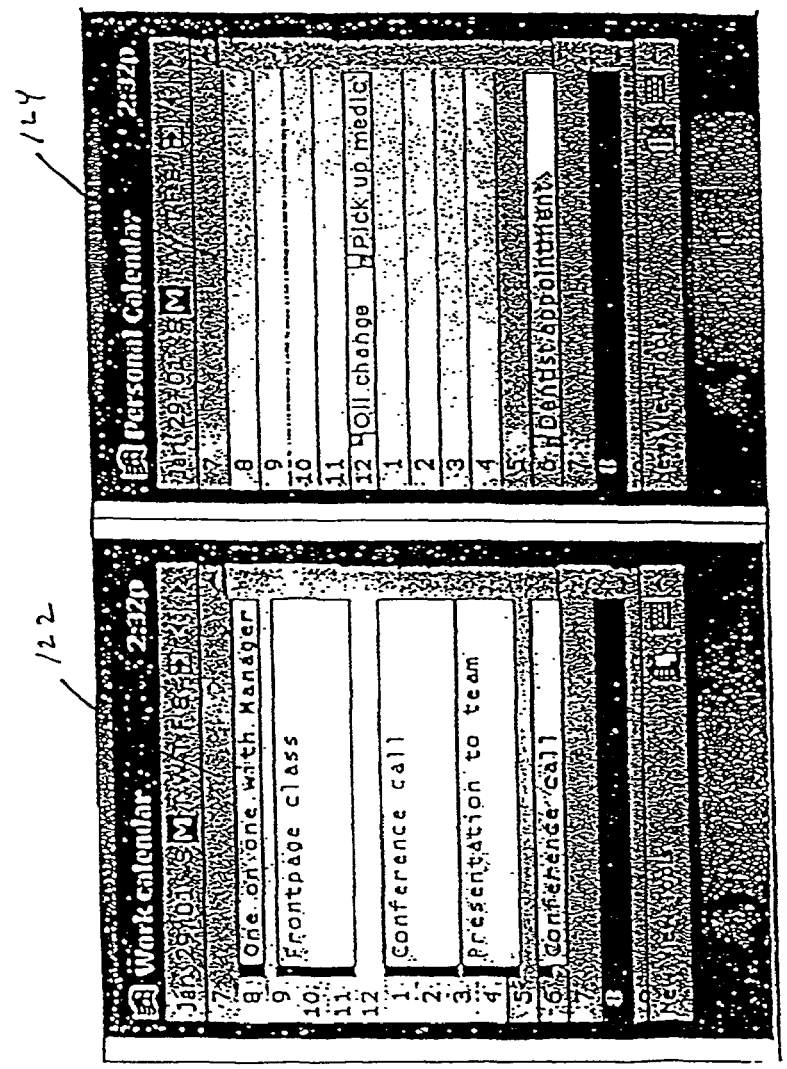
FIG. 14A illustrates a screen showing an alternate daily view of a work calendar.
FIG. 14B illustrates a screen showing an alternate daily view of a personal calendar.
FIG. 14C illustrates a screen showing an alternate daily view of a merged calendar.

It should also be appreciated that the various screens discussed herein may be arranged or organized in various manners without affecting the substance of the information presented to the family manager. For example, rather than presenting the daily agenda items as set forth in the daily calendar screens 110, 112, and 114, the daily agenda items may be presented as illustrated by the daily work calendar screen 122, the daily personal calendar screen 124, and the daily merged calendar screen 126, as illustrated in FIGS. 14A, 14B, and 14C, respectively. Each of the daily calendar screens 122, 124, and 126 display the same agenda items found on the daily calendar screens 110, 112, and 114, respectively. However, rather than forming a list of these agenda items as set forth in the daily calendar screens 110, 112, and 114, the daily calendar screens 122, 124, and 126 present one hour long blocks of time that are either filled with agenda items or left blank. Thus, using the daily calendar screens 122, 124, and 126, the family manager is better able to determine open blocks of time at a glance.

Figures 15A, 15B, 15C:
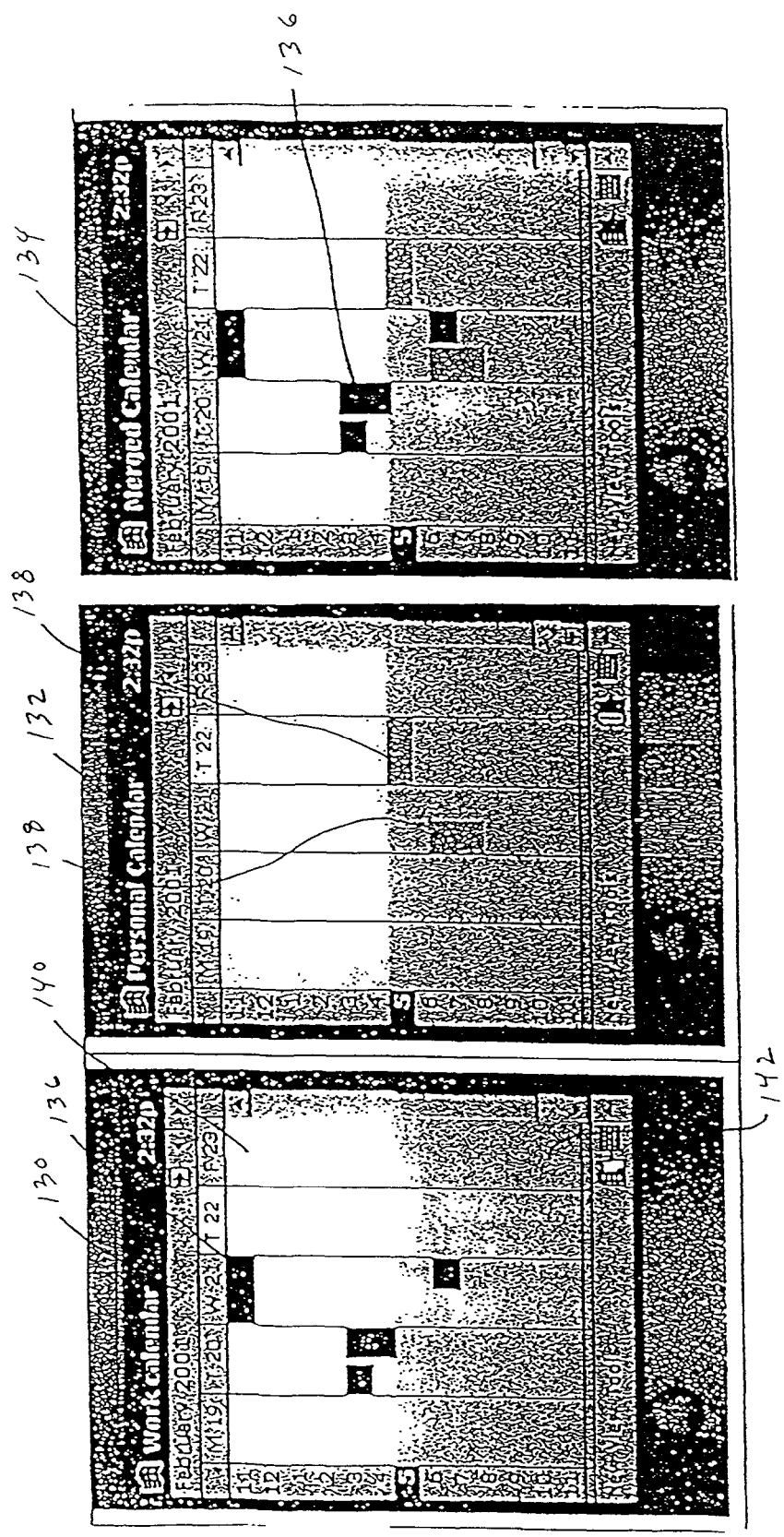
FIG. 15A illustrates a screen showing a weekly view of a work calendar.
FIG. 15B illustrates a screen showing a weekly view of a personal calendar.
FIG. 15C illustrates a screen showing a weekly view of a merged calendar.

It is also advantageous for the device 54 to be able to display weekly and monthly calendars. As illustrated in FIGS. 15A, 15B, and 15C, the device 54 may display a weekly work calendar 130, a weekly personal calendar 132, and a weekly merged calendar 134. Although the weekly calendar screens 130, 132, and 134 display a five day work week, a seven day week may also be displayed, either all at one time or using the side scroll function. Due to the relatively small size of the display 94 and the relatively large amount of information that may be found on a weekly calendar, the agenda items are illustrated as colored blocks on the screens 130, 132, and 134. For example, the work-related agenda items may be illustrated using black blocks 136, and the personal agenda items may be illustrated using green blocks 138. By color coding the work-related and personal agenda items, the user is better able to determine the source of the item at a glance. The calendar screens may also include an unshaded portion 140 and a shaded portion 142, demarcated at 5:00 for instance, so that the family manager can generally distinguish between agenda items occurring during normal work hours and agenda items occurring during normal personal hours.

Figures 16A, 16B, 16C:
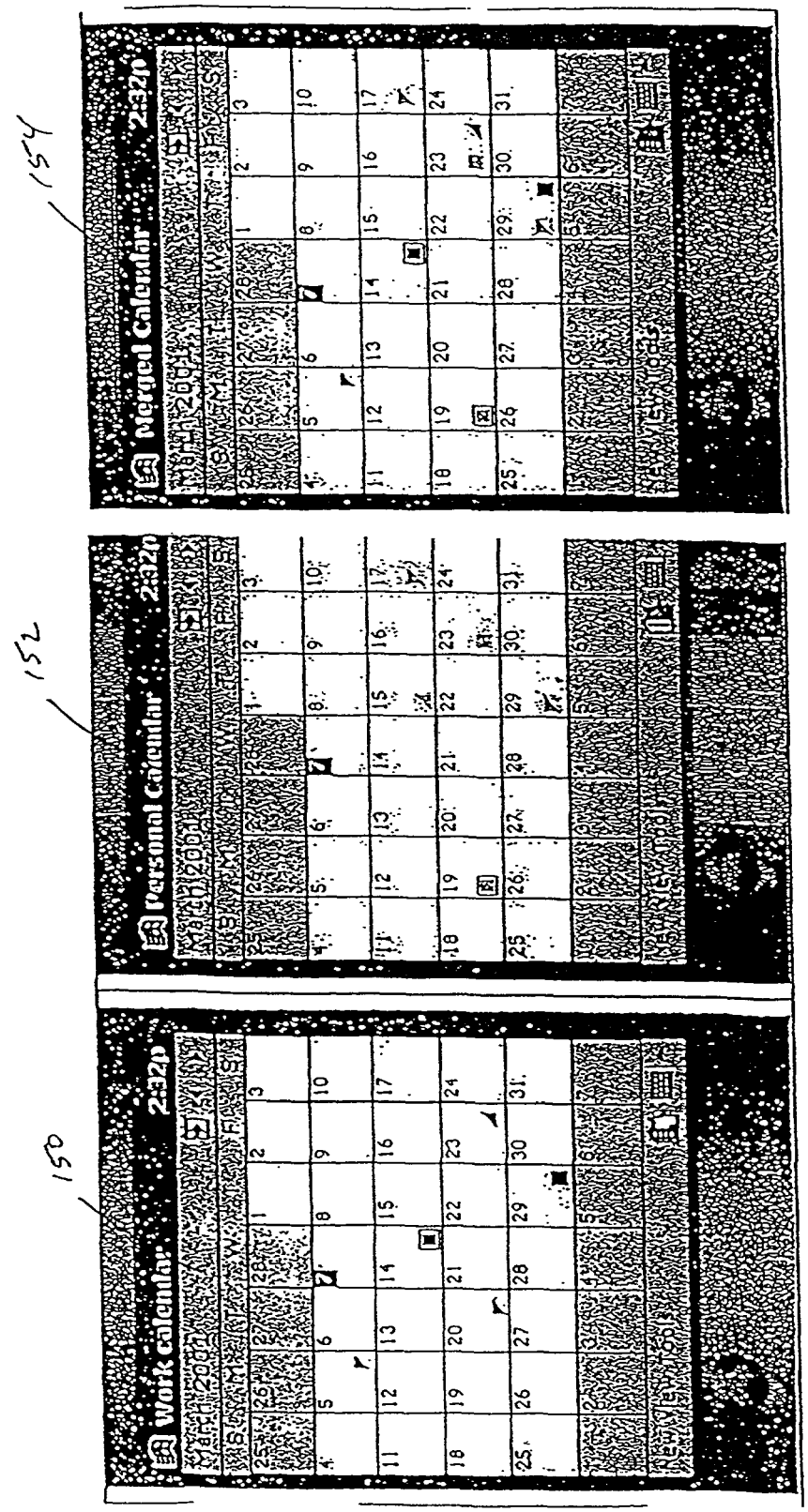
FIG. 16A illustrates a screen showing a monthly view of a work calendar.
FIG. 16B illustrates a screen showing a monthly view of a personal calendar.
FIG. 16C illustrates a screen showing a monthly view of a merged calendar.

Examples of a monthly work calendar screen 150, a monthly personal calendar screen 152, and a monthly merged calendar screen 154 are illustrated in FIGS. 16A, 16B, and 16C, respectively. Again, work related items and personal items may be designated using different colors, textures, shapes, and/or locations. Also, as with the weekly calendars discussed above, due to the relatively small size of the display 94 and the relatively large amount of information that may be found on a monthly calendar, the agenda items are illustrated as colored blocks on the screens 150, 152, and 154. In addition in this example, work related items are placed in the lower right hand corner within a date, and personal items are placed in the lower left hand corner within a date. When an appointment is in the evening only, only the lower right hand corner of the box will be present, while when the appointment is in the morning only the upper left hand corner of the box will be present. When there is an appointment in the morning and the afternoon, a complete box will be present.

Figures 17A, 17B, 17C:
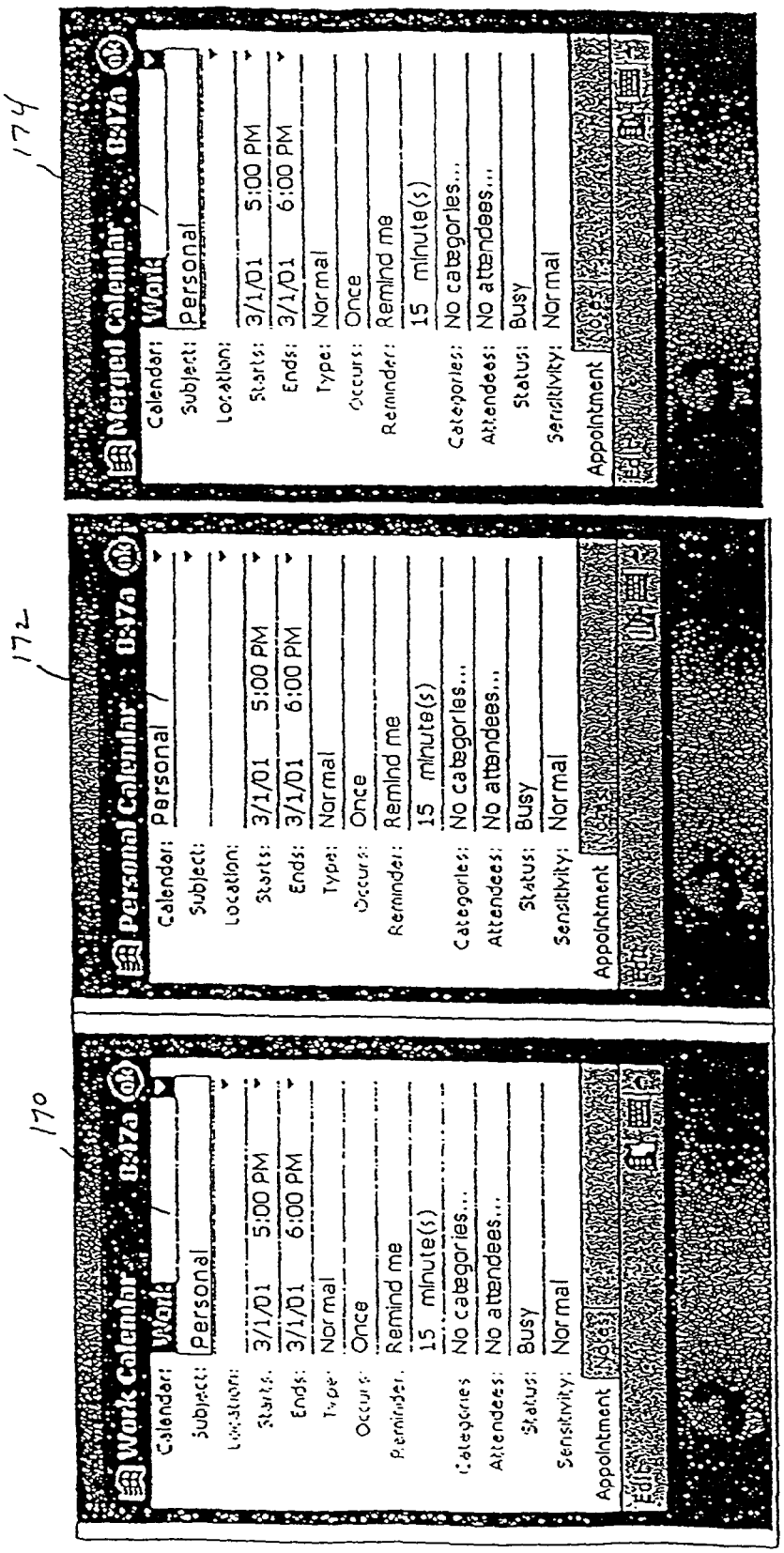
FIG. 17A illustrates a screen for making new work appointments.
FIG. 17B illustrates a screen for making new personal appointments.
FIG. 17C illustrates a screen for making new work or personal appointments.
Figures 18A, 18B, 18C:
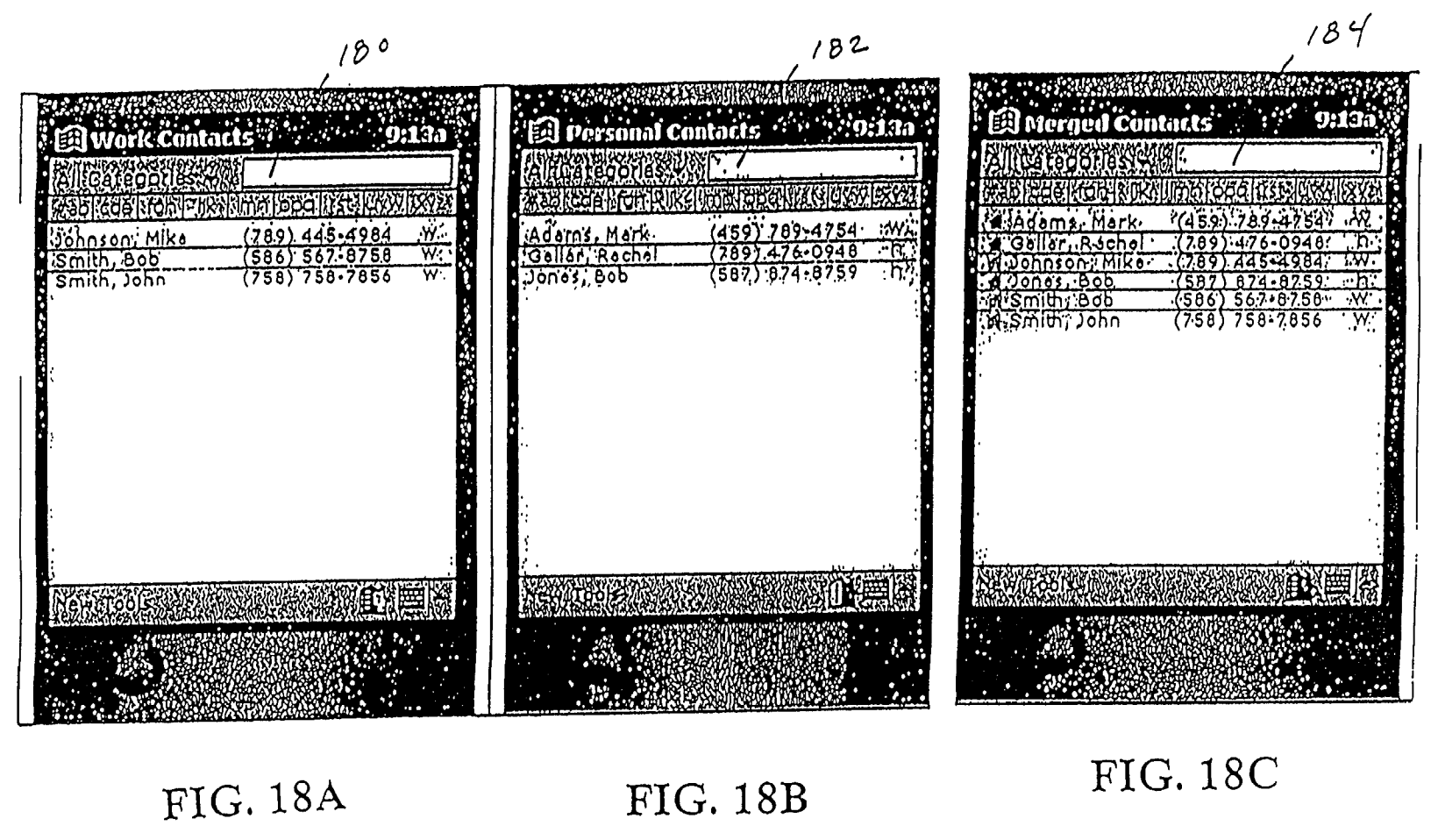
Figures 19A, 19B, 19C:
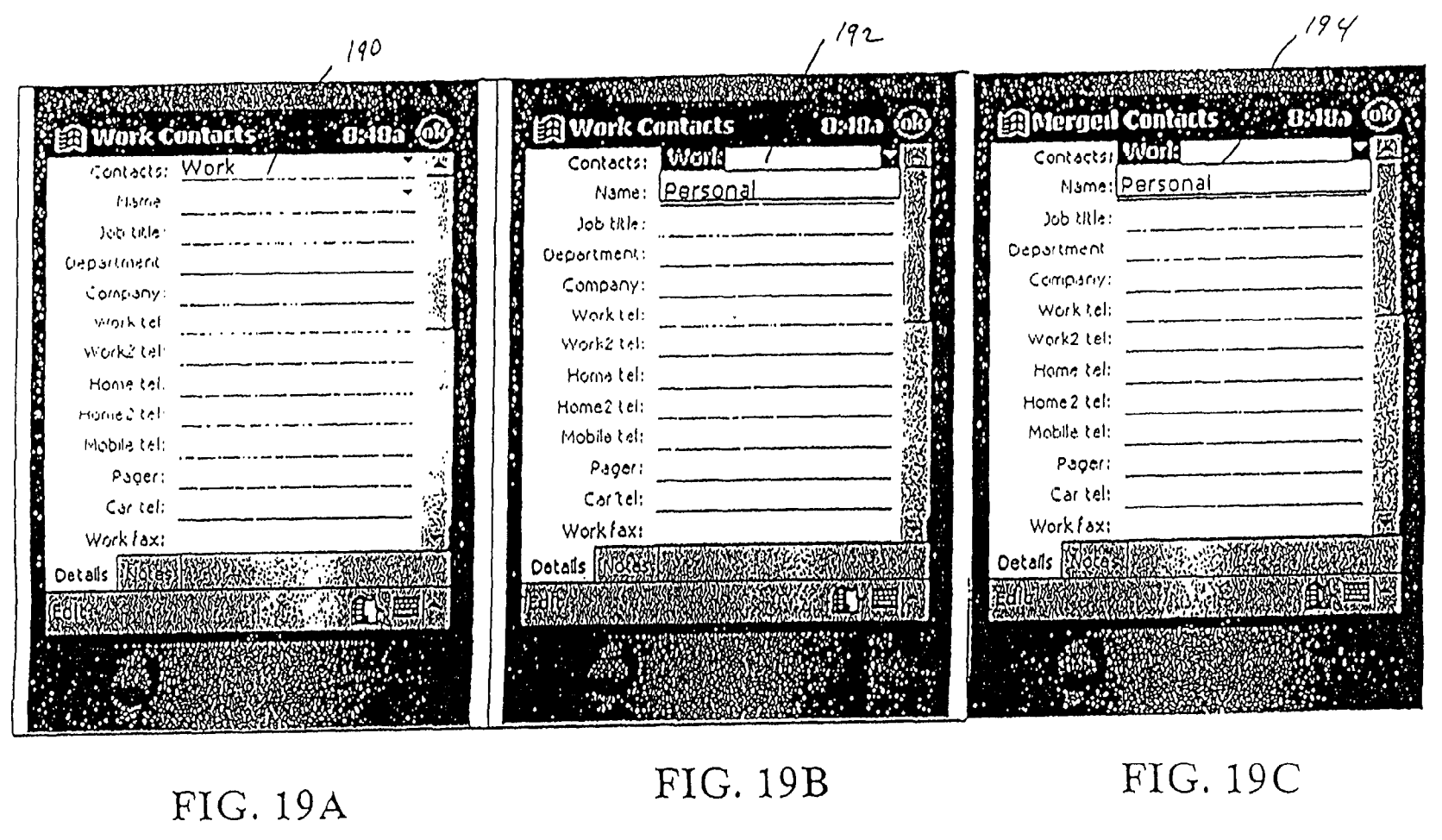

To add an appointment to a work calendar, personal calendar, or merged calendar, the family manager may utilize the work appointment screen 170, the personal appointment screen 172, or the merged appointment screen 174 illustrated in FIGS. 17A, 17B, and 17C, respectively. Using the appropriate appointment screen 170, 172, or 174, the family manager can enter the date and time of the agenda item, along with various other information, such as reminders, lists of attendees, and urgency. In a similar fashion, the family manager can add new contacts to the work contact screen 180, the personal contact screen 182, or the merged contact screen 184 illustrated in FIGS. 18A, 18B, and 18C, respectively. Using the new work contact screen 190, the new personal contact screen 192, or the new merged contact screen 194 illustrated in FIGS. 19A, 19B, and 19C, respectively, the family manager can enter a contact's name along with other information, such as job title, telephone numbers, etc. Once a new contact is entered using one of the new contact screens 190, 192, or 194, the contact's name and other pertinent information is displayed on the appropriate contact screen 180, 182, or 184, respectively.

Figure 20:
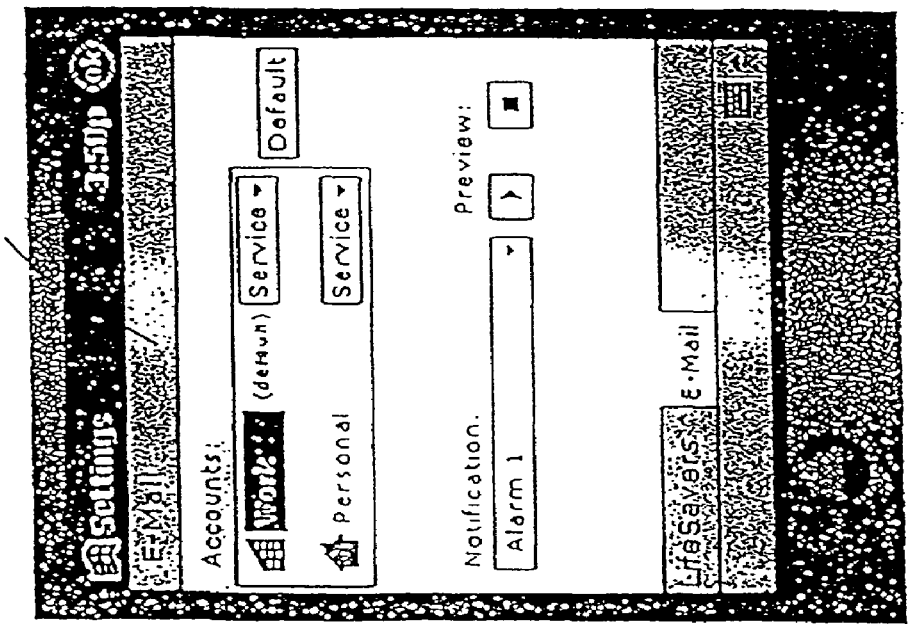
FIG. 20 illustrates a screen showing work and personal e-mail accounts.

To set up or access e-mail accounts, the device 54 may display an e-mail account screen 200. Using the e-mail account screen 200, the family manager can set up and access a work e-mail account and a personal e-mail account. In this example, the work e-mail account is set up as the default account as illustrated in FIG. 20. As discussed previously, the "service" used as the work account may be a company exchange server, for example, while the "service" used as the personal account may be an ISP such as America On Line, for example.

Figure 21:
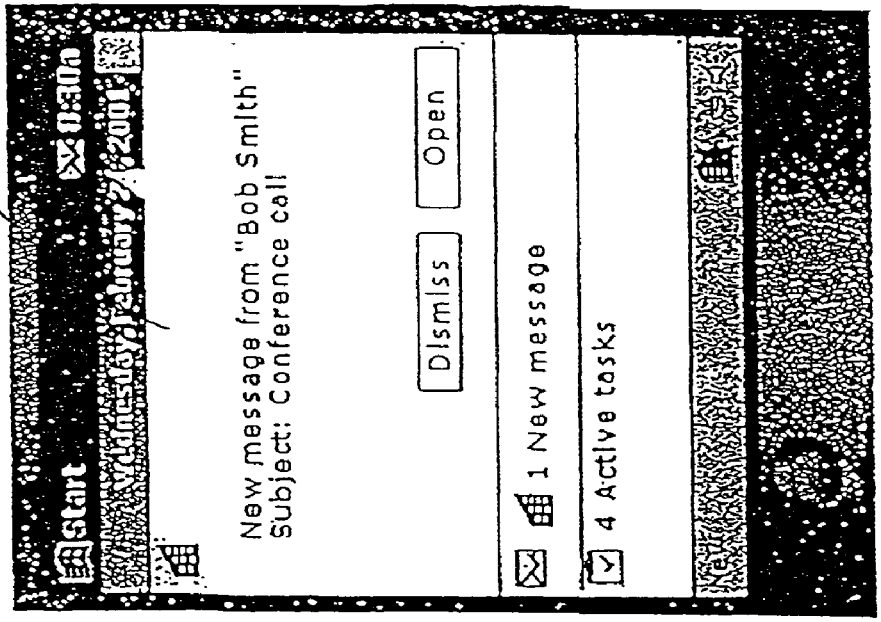
FIG. 21 illustrates an overview screen showing work and personal active tasks and new messages.

The device 54 may also display an incoming e-mail screen 206, as illustrated in FIG. 21. Advantageously, the source of the incoming e-mail message is identified using an appropriate icon, color, font, etc. so that the user can readily identify the incoming e-mail as a work related e-mail message or a personal e-mail message. In addition, the source of the incoming e-mail may be further distinguished by a sound emitted by the device 54. Indeed, as mentioned earlier, the device 54 may deliver a different notification for each type of message received so that the user can quickly and easily determine how to prioritize the message, often before looking at it. For example, if the source is work-related, the device 54 may emit a first sound, and if the source is personal, the device 54 may emit a different sound. Using this technique, a user can easily discriminate the source and quickly determine whether to view the incoming message immediately or to postpone viewing the message until later. The priority level of the incoming message may also cause the device 54 to emit a unique sound. For example, a personal priority or emergency message may have a unique sound, as might a work-related priority or emergency message.

Figures 22A, 22B, 22C:
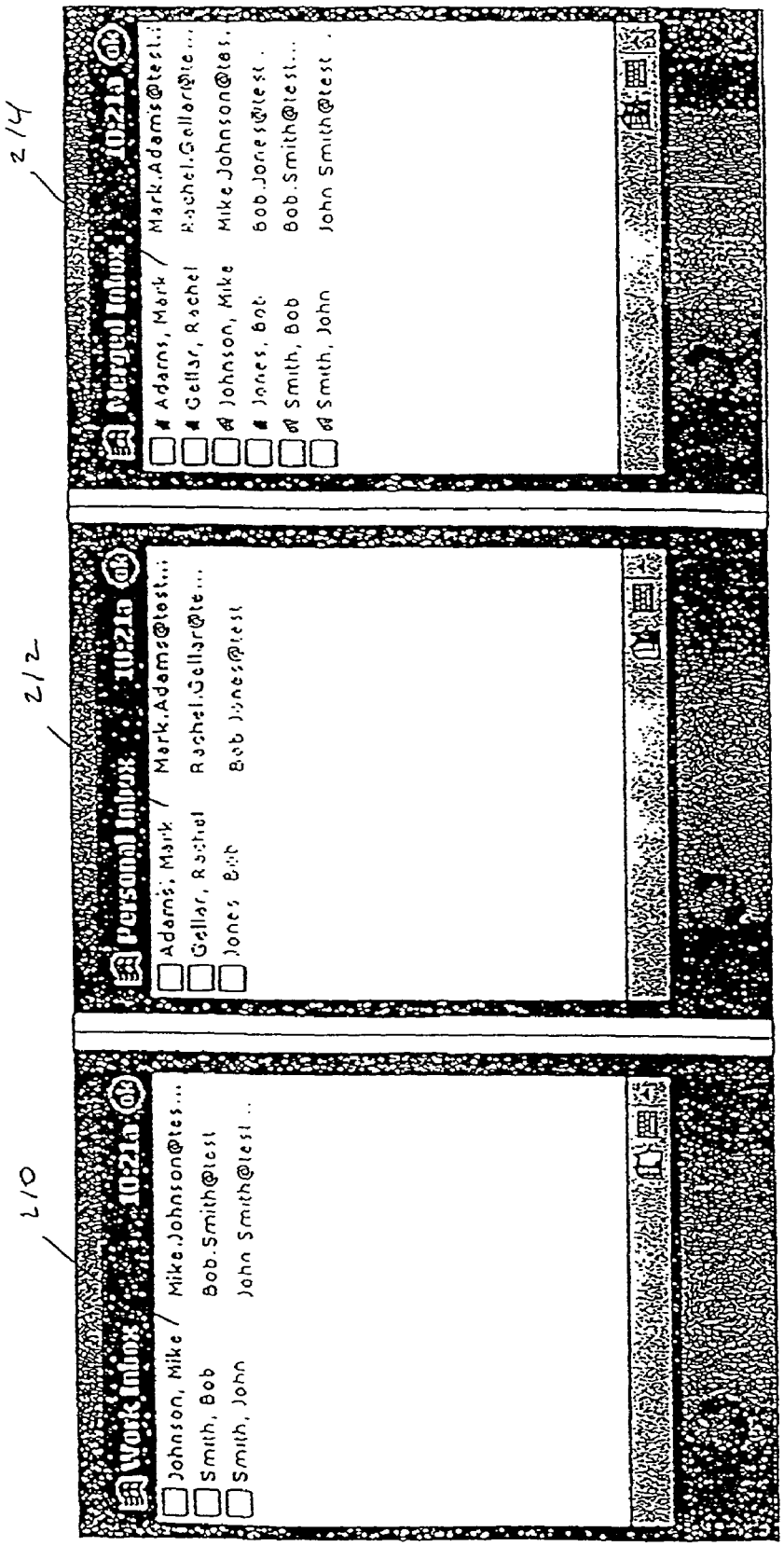
FIG. 22A illustrates a screen showing a work in-box.
FIG. 22B illustrates a screen showing a personal in-box.
FIG. 22C illustrates a screen showing a merged in-box.

The device 54 may also include various mailboxes in which the family manager can store e-mail messages. For example, the device 54 may include various standard mailboxes, such as an in-box, a sent box, and a deleted box, as well as a wide variety of user-definable mailboxes. Like much of the information discussed previously, the mail in each mailbox may be further categorized as work related mail, personal mail, or merged mail. Accordingly, the device 54 may present a work related in-box screen 210, a personal in-box screen 212, and a merged in-box screen 214, as illustrated by way of example in FIGS. 22A, 22B, and 22C, respectively. As with the previous information screens, a unique color, font, etc. may be used to designate work related items or personal items on any of the screens 210, 212, and 214, and icons may be used in the merged in-box screen 214 to provide the family manager with a further indication of the source of the e-mail message.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A device for managing a combination of family-related matters and work-related matters, the device comprising:
   a processor;
   a calendaring program running on the processor, the calendaring program adapted to provide at least one distinct calendar corresponding to only family-related matters, at least one distinct calendar corresponding to only work-related matters, and at least one distinct calendar corresponding to a merger of the family-related matters and the work-related matters, the at least one distinct calendar corresponding to the merger of the family-related matters and the work-related matters adapted to display icons that distinguish between the family-related matters and the work-related matters; and
   an input/output stage operably coupled to the processor and adapted to communicate with a remote device to update the at least one distinct calendar corresponding to family-related matters and the at least one distinct calendar corresponding to work-related matters.

2. The device, as set forth in claim 1, comprising at least one of a personal computer, a laptop computer, a handheld computer, a cellular telephone, a personal digital assistant, and a pager.

3. The device, as set forth in claim 1, wherein the input/output stage comprises at least one of an infrared link, a cellular link, a hard-wired link, an intranet link, and an Internet link.

4. The device, as set forth in claim 1, wherein the remote device comprises a host computer.

5. The device, as set forth in claim 4, wherein the host computer comprises a public host computer.

6. The device, as set forth in claim 4, wherein the host computer comprises a private host computer.

7. The device, as set forth in claim 4, wherein the host computer comprises a barrier to separate the work-related matters from the family-related matters.

8. The device, as set forth in claim 1, wherein the remote device comprises at lease one of a personal computer, a laptop computer, a handheld computer, a cellular telephone, a personal digital assistant, and a pager.

9. The device, as set forth in claim 1, wherein the at least one distinct calendar corresponding to family-related matters comprises at least one of a daily family-related calendar, a weekly family-related calendar, and a monthly family-related calendar.

10. The device, as set forth in claim 1, wherein the at least one distinct calendar corresponding to work-related matters comprises at least one of a daily work-related calendar, a weekly work-related calendar, and a monthly work-related calendar.

11. The device, as set forth in claim 1, wherein the at least one distinct calendar corresponding to the merger of family-related matters and work-related matters comprises at least one of a daily merged calendar, a weekly merged calendar, and a monthly merged calendar.

12. The device, as set forth in claim 1, wherein the icons comprise a first icon associated with the family-related matters and a second icon associated with the work-related matters, the first icon being different in appearance than the second icon.

13. The device, as set forth in claim 12, wherein the first icon resembles a house and wherein the second icon resembles an office building.

14. A system for managing a combination of family-related matters and work-related matters, the system comprising:
    a first device designated as a hub;
    a plurality of second devices;
    a host computer adapted to communicate with the first device and with the plurality of second devices; and
    a calendaring program running on at least the first device, the calendaring program adapted to provide at least one distinct calendar corresponding to only family-related matters, at least one distinct calendar corresponding to only work-related matters, and at least one distinct calendar corresponding to a merger of the family-related matters and the work-related matters, the calendaring program adapted to update the at least one distinct calendar corresponding to family-related matters and the at least one distinct calendar corresponding to work-related matters in response to communication between the first device and the host computer, the at least one distinct calendar corresponding to the merger of the family-related matters and the work-related matters adapted to display icons that distinguish between family-related matters and work-related matters.

15. The system, as set forth in claim 14, wherein the first device comprises at least one of a personal computer, a laptop computer, a handheld computer, a cellular telephone, a personal digital assistant, and a pager.

16. The system, as set forth in claim 14, wherein each of the plurality of second devices comprises at least one of a personal computer, a laptop computer, a handheld computer, a cellular telephone, a personal digital assistant, and a pager.

17. The system, as set forth in claim 14, wherein the host computer comprises a public host computer.

18. The system, as set forth in claim 14, wherein the host computer comprises a private host computer.

19. The system, as set forth in claim 14, wherein the host computer communicates both the family-related matters and the work-related matters to the first device, and wherein the host computer communicates only one of the family-related matters or the work-related matters to each of the plurality of second devices.

20. The system, as set forth in claim 14, comprising at least one of an infrared link, a cellular link, a hard-wired link, an intranet link, and an Internet link between the host computer and the first device and between the host computer and each of the second devices.

21. The system, as set forth in claim 14, wherein the host computer comprises a barrier to separate the work-related matters from the family-related matters.

22. The system, as set forth in claim 14, wherein the at least one distinct calendar corresponding to family-related matters comprises at least one of a daily family-related calendar, a weekly family-related calendar, and a monthly family-related calendar.

23. The system, as set forth in claim 14, wherein the at least one distinct calendar corresponding to work-related matters comprises at least one of a daily work-related calendar, a weekly work-related calendar, and a monthly work-related calendar.

24. The system, as set forth in claim 14, wherein the at least one distinct calendar corresponding to the merger of family-related matters and work-related matters comprises at least one of a daily merged calendar, a weekly merged calendar, and a monthly merged calendar.

25. The system, as set forth in claim 14, wherein the icons comprise a first icon associated with the family-related matters and a second icon associated with the work-related matters, the first icon being different in appearance than the second icon.

26. The system, as set forth in claim 25, wherein the first icon resembles a house and wherein the second icon resembles an office building.

27. A system for managing a combination of family-related matters and work-related matters, the system comprising:
    a family/work device;
    a plurality of work devices;
    a private host computer communicatively coupled to the family/work device and to the plurality of work devices, the private host computer maintaining work-related matters;
    a plurality of family devices;
    a public host computer communicatively coupled to the family/work device and to the plurality of family devices, the public host computer maintaining family-related matters; and
    a calendaring program running on at least the family/work device, the calendaring program adapted to provide at least one distinct calendar corresponding to only family-related matters and at least one distinct calendar corresponding to only work-related matters, the calendaring program adapted to update the at least one distinct calendar corresponding to family-related matters and the at least one distinct calendar corresponding to work-related matters in response to communication between the family/work device and the host computers.

28. The system, as set forth in claim 27, wherein the family/work device comprises at least one of a personal computer, a laptop computer, a handheld computer, a cellular telephone, a personal digital assistant, and a pager.

29. The system, as set forth in claim 27, wherein each of the plurality of work devices and each of the plurality of family devices comprise at least one of a personal computer, a laptop computer, a handheld computer, a cellular telephone, a personal digital assistant, and a pager.

30. The system, as set forth in claim 27, comprising at least one of an infrared link, a cellular link, a hard-wired link, an intranet link, and an Internet link between the private host computer and the family/work device, between the private host computer and each of the work devices, between the public host computer and the family/work device, and between the public host computer and each of the family devices.

31. The system, as set forth in claim 27, wherein the at least one distinct calendar corresponding to family-related matters comprises at least one of a daily family-related calendar, a weekly family-related calendar, and a monthly family-related calendar.

32. The system, as set forth in claim 27, wherein the at least one distinct calendar corresponding to work-related matters comprises at least one of a daily work-related calendar, a weekly work-related calendar, and a monthly work-related calendar.

33. The system, as set forth in claim 27, wherein the calendaring program is adapted to provide at least one distinct calendar corresponding to a merger of the family-related matters and the work-related matters.

34. The system, as set forth in claim 33, wherein the at least one distinct calendar corresponding to the merger of family-related matters and work-related matters comprises at least one of a daily merged calendar, a weekly merged calendar, and a monthly merged calendar.

35. The system, as set forth in claim 27, wherein the calendaring program is adapted to display icons that distinguish between the family-related matters and the work-related matters.

36. The system, as set forth in claim 35, wherein the icons comprise a first icon associated with the family-related matters and a second icon associated with the work-related matters, the first icon being different in appearance than the second icon.

37. The system, as set forth in claim 36, wherein the first icon resembles a house and wherein the second icon resembles an office building.

* * * * *